US008906442B2

United States Patent
Buri Stauffacher et al.

(10) Patent No.: US 8,906,442 B2
(45) Date of Patent: Dec. 9, 2014

(54) PROCESS FOR PRODUCING DARK CHOCOLATE

(75) Inventors: Ursi Buri Stauffacher, Zurich (CH); Chantal Bussmann, Horgen (CH); Willi Ammann, Steinhausen (CH)

(73) Assignee: Chocoladefabriken Lindt & Sprungli AG, Kilchberg (CH)

( * ) Notice: Subject to any disclaimer, the term of this patent is extended or adjusted under 35 U.S.C. 154(b) by 372 days.

(21) Appl. No.: 12/671,676

(22) PCT Filed: Aug. 2, 2007

(86) PCT No.: PCT/CH2007/000377
§ 371 (c)(1),
(2), (4) Date: Feb. 1, 2010

(87) PCT Pub. No.: WO2009/015494
PCT Pub. Date: Feb. 5, 2009

(65) Prior Publication Data
US 2010/0303982 A1 Dec. 2, 2010

(51) Int. Cl.
A23G 1/00 (2006.01)
A23G 1/04 (2006.01)
A23G 1/08 (2006.01)

(52) U.S. Cl.
CPC .............. *A23G 1/0009* (2013.01); *A23G 1/042* (2013.01)
USPC ........................................... 426/631; 99/503

(58) Field of Classification Search
CPC ................................ A23G 1/009; A23G 1/042
USPC ........................................................ 426/631
See application file for complete search history.

(56) References Cited

U.S. PATENT DOCUMENTS

| | | | | |
|---|---|---|---|---|
| 3,934,792 | A * | 1/1976 | High et al. | 494/54 |
| 6,066,350 | A * | 5/2000 | Purtle et al. | 426/430 |
| 6,361,814 | B2 * | 3/2002 | Purtle et al. | 426/430 |
| 2004/0071848 | A1 * | 4/2004 | Gusek et al. | 426/430 |
| 2006/0198932 | A1 * | 9/2006 | Purtle et al. | 426/430 |

FOREIGN PATENT DOCUMENTS

| | | | |
|---|---|---|---|
| CH | WO2005/004619 | * | 1/2005 |
| DE | 1239926 | | 5/1967 |
| DE | 7901090 U | | 1/1979 |
| DE | 4139817 A1 | | 6/1993 |
| DE | 10253810 A1 | | 5/2004 |
| GB | 191116431 | | 0/1911 |
| GB | 191314758 | | 0/1914 |

OTHER PUBLICATIONS

Minifie, B. W. 1980. Chocolate, Cocoa and Confectionery: Science and Technology, 2nd edition. AVI Publishing Company, Westport, CT, p. 52-57, 113-117.*
Minifie, Bernard. 1980. Chocolate, Cocoa and Confectionery: Science and Technology, $2^{nd}$ edition. AVI Publishing Company, Inc. Westport, CT. p. 52-54, 107-108.*
Teubner, C. et al. 1997. The Chocolate Bible. Penguin Studio, New York. p. 38-41.*
Beckett, S. T. 1988. Industrial Chocolate Manufacture and Use. Blackie Academic & Professional, New York. p. 277.*
International Search Report for International Application No. PCT/CH2007/000377, dated May 13, 2008, in 6 pages.
S. Beckett 1988, Industrial Chocolate Manufacture and Use in one page.
Marshalkin et al, Manufacture of chocolate mass from centrifuged cocoa mass in two pages.
Kohlus et al., Dampfdrucküberkagerte Zentrifugation in three pages, 1997.

* cited by examiner

*Primary Examiner* — Carolyn Paden
(74) *Attorney, Agent, or Firm* — Knobbe, Martens, Olson & Bear, LLP

(57) ABSTRACT

A process and a plant are proposed for producing dark chocolate which make it possible to produce dark chocolate, in particular also single-variety dark chocolate, having a high cocoa content without cocoa powder needing to be produced and/or added. By means of a partial defatting of the cocoa mass in a process step which is connected upstream of the mixing, grinding and/or conching, the fat content in the cocoa mass is reduced to the extent that dark chocolates can be produced having a high cocoa content without cocoa powder needing to be added. The partial defatting of the cocoa mass is preferably carried out using a decanter (50). The cocoa butter fraction (2) according to the invention occurs on decanting as a high-fat fraction which still contains a fraction of 17 to 21% by weight, a maximum of 30% by weight, of fat-free cocoa dry matter. In the novel process according to the present invention, the expenditure for producing a highly defatted cocoa powder is avoided, since the cocoa mass (11) is only defatted to the point that the mass produced therefrom can be comminuted without problem using rollers (30) and can subsequently be conched. The cocoa butter fraction is added during conching after the comminution in a ball mill.

19 Claims, 2 Drawing Sheets

PROCESS FOR PRODUCING DARK CHOCOLATE

RELATED APPLICATIONS

The present application is the U.S. national phase application under 35 U.S.C §371 of PCT/CH2007/000377, filed Aug. 2,2007, the entirety of which is hereby incorporated herein by reference

FIELD OF THE INVENTION

The present invention relates to the field of producing dark chocolate.

BACKGROUND OF THE INVENTION

The demand for dark chocolate having a high cocoa content has increased greatly internationally in recent years. Scientific studies in which it has been found that the consumption of dark chocolate protects the cardiovascular system may have contributed to bitter chocolates and refined bitter chocolates, that is to say dark chocolates having high cocoa fractions of greater than 70 to up to 99% by weight being consumed more often.

However, dark chocolate is not experiencing increasing popularity only owing to its high content of antioxidants, such as, for example flavonoids such as epicatechin, but especially because of its intense flavour. Gourmets also value single-variety chocolates, in addition to a high cocoa content. Such chocolates are distinguished in that they are produced from cocoa beans of individual noble cocoa varieties such as, for example, the Criollo or Arriba varieties which are native to Central and South America. Since, as in the cultivation of cocoa, as in viticulture, the position of the cultivation areas has a decisive effect on the quality of the cocoa beans, the single-variety chocolates are preferably produced from beans of known cultivation areas and provenances. A connoisseur who prizes the intense richness of aroma of a noble Arriba cocoa, will prefer a chocolate which originates from beans from the low-lying tropical coastal area of Ecuador. If a chocolate having a milder character is wanted, then, for example cocoa from Madagascar, preferably from the northwest island region Sambirano will be selected, which guarantees a balanced, fruity mild character of the chocolate.

For the understanding of the present invention, it is critical to know the traditional production processes for chocolate. An introduction thereto may be obtained, for example, from the pamphlet Chocologie der Chocosuisse, Münzgraben 6, CH 3000 Bern, of 2001. Therefore, hereinafter, only the essential steps in chocolate production will be briefly considered.

Various cocoa varieties and provenances are blended according to company-specific, and frequently highly secret, recipes from the individual manufacturers. The blending ratios have critical effects on the flavour of the respective chocolate.

The shells are removed from the beans and the beans are broken into medium-size pieces, called nibs. The shells are separated from the cocoa nibs by sieving and suction. In the subsequent roasting, primary refining and intensification of the aroma of the broken cocoa beans is sought.

In the subsequent grinding, the coarse nibs are comminuted in mills and ground to a fine cocoa mass. Known mills are fly cutter and ball mills. By means of the heat formed during grinding and as a result of the mechanical disruption of the fat-containing plant cells, the fat proportion contained in the cocoa beans, called cocoa butter, is released and the cocoa mass liquefies. Depending on cocoa variety, the fraction of cocoa butter present in the beans, the melting range of which is approximately 30 to 37° C., is about 50 to 55% by weight, in exceptional cases up to 56% by weight. Provenance plays an important role in the fat content, wherein customarily for beans of the main harvest fat contents of 51 to 53% by weight can be counted upon.

The cocoa mass formed on grinding is a dark thick mass which solidifies on cooling to room temperature. The Dutch chemist Coenraad van Houten applied as early as 1828 for a patent for a hydraulic press for defatting cocoa mass. The cocoa butter fraction of the liquid cocoa mass was able to be reduced thereby to about 27 to 28%. Today, the fat proportion of the cocoa mass, that is to say the cocoa butter, is customarily pressed off in high-performance presses at temperatures of 80° C. and 90° C. and a pressure of 500 bar. The defatted press cake must subsequently be ground in a further processing step to give cocoa powder. The press cake routinely contains a fat proportion of 10 to 12%, or of 20 to 22%. In order that it still may be able to be processed to powder, it must have a maximum fat content of 30%. The liquid fraction which is expressed, that is to say the cocoa butter, is principally used for producing chocolate, but can also be used in cosmetics and pharmaceutical products.

For producing the cocoa butter and the cocoa powder, some of the cocoa mass is fed to hydraulic high-performance presses which, at temperatures of 80° C. to 90° C., and a pressure of 500 bar, reduce the fat content in the cocoa mass to 10 to 22% by weight (hereinafter, all percentages are taken to mean percent by weight, unless explicitly stated otherwise). When the cocoa butter is expressed from the cocoa mass, what is termed "cocoa cake" is formed, almost as a by-product, the fat content of which after pressing varies between 10 and 22%. Alternatively to the known pressing processes, it was proposed in DE 102 53 810 to remove the cocoa butter from finely ground cocoa mass by means of centrifugation and thereby to improve the yield of cocoa butter, that is to say to reduce the fat content of the cocoa powder. Other processes for producing highly defatted cocoa powder are known from US 2006/0198932. Here, it is proposed to process cocoa mass in a continuous extraction process using solvents to give cocoa powder having a fat content of down to below 0.5% by weight. The organic solvents are mixed with the cocoa mass in a tank with supply of heat, and subsequently the solid and liquid phases of the low-viscosity suspension are separated from one another in a horizontal decanter centrifuge. The solid phase or powder phase obtained in this manner is heated further with organic solvent in a second step and fed a second time to the centrifuge. From the solid phase of the second extraction step, the organic solvent must then again be evaporated off. The liquid fractions of cocoa butter and solvent must likewise be post-treated in order to remove the solvent.

The high amount of effort required to obtain the cocoa butter is explained firstly by the value of the noble fat with its distinct aroma which, when filtered and purified is similar to best fresh butter in appearance, but is significantly harder. In the finished chocolate, it has a great share in the structure, gloss and the pleasant melt. Although cocoa butter is traded in great style, single-variety cocoa butter is hardly obtainable on the market at all. In principle, in processes for obtaining cocoa butter, there is always interest in the maximum yield of the liquid cocoa butter phase. In the process for defatting the cocoa mass, the focus correspondingly lies on the maximum yield of the dry phase.

Depending on what chocolate variety is to be produced, in the subsequent process steps the ingredients and their quantitative fractions are selected according to certain base recipes and they are added in a defined sequence.

On a national or regional level, appropriate acts and regulations establish precisely in what limits the blending ratios may vary and what ingredients may be used.

For producing dark chocolate having a high cocoa content, generally, according to the base recipe, cocoa mass, cocoa butter, cocoa powder, sugar and vanilla or vanillin are used. These ingredients are finely divided and kneaded in a mixer until a homogeneous pasty mass has formed which, however, is perceived as sandy, since the cocoa particles and the sugar are still present at a size in the range from 20 to 500 µm. In addition, the mass still contains a number of unwanted constituents which adversely effect the flavour.

In order to optimize the sensory properties, the mass is comminuted in a roll mill under the action of pressure and shear forces down to a particle size of below 20 µm.

The odour and flavour substances which are unwanted and disadvantageous for the aroma of the chocolate, which are present, for example, as volatile acids, and which are still present in the roll-milled mass, are removed in the subsequent conching. The intensive shear and friction forces (internal friction) and the intense aeration to which the roll-milled mass is exposed during conching contribute critically to the improvement in taste and sensory properties of the chocolate. In earlier times, conching was performed for up to several days. Thanks to modern conching processes, the processing time in modern turnover conchees can be reduced to a few hours. Nevertheless this ensures that the highest homogeneity and smoothness are achieved, and the individual components of the chocolate are bound together in flavour. A fine film of cocoa butter deposits around each of the microscopically small sugar and cocoa particles.

After completion of conching, the liquid chocolate mass can be stored temporarily at 45 to 50° C. Immediately before the moulding process it is precrystallized. The precrystallization also called tempering, is a critical process since it is responsible for the soft melt, the silky gloss and the rounded flavour of the solidified chocolate. In addition, it plays an important role for the storage life of the finished chocolate. The dark chocolate mass, during the precrystallization, is warmed with gentle movement to 50° C., then cooled to about 27 to 29° C., and again warmed to about 29 to 32° C. It has then reached the correct flow property and crystallization precursor, and so, after pouring into the moulds and solidification, problem-free removal from the moulds is guaranteed.

According to the known production processes for dark chocolates having a high cocoa content, cocoa powder must be added in the mixer, since the cocoa mass having a customary fat content of greater than 50% by weight cannot be further processed using rolls. If a high cocoa content must be achieved, the fat content may only be reduced to a certain extent by adding sugar, and so efficient rolling is only possible after addition of cocoa powder.

SUMMARY OF THE INVENTION

It is the object of the present invention to provide a process and a plant for producing dark high-percentage chocolate, which do not have the disadvantages of the processes and plants which are on the market. In particular, alternative production processes should be proposed which permit more efficient production and simpler logistics during the production of dark chocolate having a high cocoa fraction and single-variety dark high-percentage chocolate.

This object is achieved by the novel processes and plants according to the invention for producing dark chocolate.

They enable dark chocolate, in particular also single-variety dark chocolate, to be produced having a high cocoa content without cocoa powder needing to be produced and added.

The processes and devices according to the invention permit, by means of partial defatting of the cocoa mass in a process step which is connected upstream of the mixing, rolling and conching, to decrease the fat content in the cocoa mass to the extent that dark chocolate having a high cocoa mass fraction of at least 57%, but also those having a fraction of over 70%, can be produced, without cocoa powder needing to be added during mixing, before rolling or during conching.

In further preferred embodiments of the present invention, processes and devices are provided in which the partial defatting of the cocoa mass is carried out in a decanter.

An essential feature of the invention is the partial defatting of the cocoa mass, which is preferably carried out by means of a decanter. Partial defatting is taken to mean reduction of the initial fat content of the cocoa mass by 5 to 15% by weight to a fat content of 42 to 49% by weight, preferably to 45 to 49% by weight, and particularly preferably to 47% by weight. The partial defatting permits the fraction of fat-free cocoa dry matter to be increased in the partially defatted cocoa mass.

The novel process according to the present invention advantageously permits dark chocolate, that is to say chocolate having a high cocoa mass content of 57 to 80% by weight, preferably 65 to 75% by weight, to be produced without cocoa powder produced in the course of the production process or external cocoa powder purchased from third parties needing to be used.

The process according to the invention is particularly advantageously suitable for producing single-variety chocolate having a high cocoa mass fraction of at least 57% by weight, preferably 65 to over 75% by weight.

The abovementioned advantages are enabled according to preferred embodiments by using a decanter or a solid bowl screw centrifuge for the partial defatting of the cocoa mass. If not explicitly stated otherwise, hereinafter the expression decanter shall also comprise solid bowl screw centrifuges. For a person skilled in the art who knows the material parameters, in particular the rheological parameters of the cocoa mass, everything argues against using a decanter for processing cocoa mass. Decanters, as are known, for example, from the German utility model DE 7901090, are used for separating off solids from liquids or thin slurries and do not withstand the high mechanical stresses as occur during the processing of the viscous cocoa mass. For separating a solid-liquid mixture, the decanter comprises an at least partial conical drum which can be driven so as to rotate in which is arranged a screw which can be driven so as to rotate at a differential speed of rotation. Spirals of the screw are constructed adapted to the inner wall of the drum in such a manner that the solid settling under centrifugal force in the separation space formed between the screw hub and the drum can be conveyed to a solid discharge formed in the conically tapered end region of the drum. Owing to the viscosity of the mass increasing with decreasing fat content, blocking the screw should be preprogrammed in conventional decanters.

According to the present invention, therefore, a decanter having an armoured screw having hardened material in the flank zone is used in order to withstand the mechanical stress and the abrasive action of the cocoa mass. In order to offer mechanical resistances as low as possible in the separation zone, which would promote closing or blocking of the decanter, the screw is preferably polished and is free from flank coatings.

In order to be able to influence advantageously the residence time of the mass which is to be separated in the separation zone and the flow behaviour of the mass on entry into the separation zone, preferably a slotted screw is used in the decanter according to the present invention. The type, number and shape of the slots are optimized in such a manner that the mass can pass into the separation zone at the earliest possible point/location.

An important design criterion of the decanter for the partial defatting of cocoa mass is the length-diameter ratio l:d (slenderness ratio) of the drum. In preferred exemplary embodiments, the slenderness ratio, that is to say the value of l:d, is between 2 and 4.5, preferably 3 to 4.

The decanter preferably has a two-motor frequency-controlled drive for drum and screw. The maximum speed of rotation of the drum is about 4550 rotations per minute, and the differential speed of rotation of the screw is between 13 and 25, preferably 18 and 23, and particularly preferably 20 and 22. It has proved to be advantageous to control the drive of the screw in a load-dependent manner. As soon as the screw drive experiences a load above a preset value, the differential speed of rotation is automatically increased in order to prevent blocking.

Preferably, the screw, in the conically tapered end region of the drum at the solid discharge, bears a baffle disc, also called emersion disc, the diameter of which determines the back pressure in the drum. The inner diameter of a regulating disc arranged in the region of the exit of the liquid phase determines the site of phase separation in the decanter.

According to the process according to the invention, the ideal entry temperature of the cocoa mass into the decanter is 52° C. to 58° C., preferably 55° C. The output of the feed pump is between 600 and 1000 kg/hour. The yield of partially defatted cocoa mass varies between 65 and 90%, customarily between 75 and 85%, and depends on the sought-after fat content of the defatted cocoa mass, on the differential speed of rotation and on the amount of cocoa mass to be defatted which is fed.

The newly occurring partly defatted cocoa mass occurring as an intermediate need not pass through any further process step before further processing, but can be introduced into the mixer in an actual online process in the form as it occurs on decanting. In comparison therewith, the cocoa press cake occurring in the conventional process must always be ground to cocoa powder after pressing. Not until it is in this form is it possible to add it to the mixer, or in rare cases the conche. Firstly, the novel processes permit, with relatively low demands of apparatus and energy, the novel intermediates required for producing dark chocolate to be produced, secondly, the logistics in the production of single-variety dark chocolates are enormously enhanced. This is particularly advantageous, since high-value single-variety cocoa powder is frequently not available on the market. The novel intermediates are a partially defatted cocoa mass having a fat content of 45 to 49% by weight, preferably 47% by weight, and a cocoa butter fraction having a residual content of fat-free cocoa dry matter of 5 to 30% by weight, preferably 17 to 21% by weight. Since the partially defatted cocoa mass can be further processed directly in the mixer and since no additional cocoa powder needs to be added, any reception control of external cocoa powder or monitoring of internally produced cocoa powder is omitted. The purity of the variety is ensured in the process according to the invention solely by the appropriate mixture of the beans.

As mentioned hereinbefore, the cocoa butter fraction according to the invention occurs on decanting as a high-fat fraction which customarily still contains a fraction of 17 to 21% by weight of fat-free cocoa dry matter. According to the present invention, the cocoa particles in the cocoa butter fraction are finely comminuted in a further processing step, preferably they are ground to the desired final fineness up to below 16 μm by means of a ball mill in one or two passages. Preferably, the cocoa butter fraction comminuted in this manner is added again in the conche to the mixture of partially defatted cocoa mass and sugar. In the conventional production processes, the fat-free cocoa dry matter is customarily added in the mixer completely in the form of cocoa powder. The cocoa butter, according to other known recipes, is added in whole or at least in part in the conche. If a process using precomminuted cocoa mass is selected, which cocoa mass is added in the conche, then the precomminuted cocoa mass is usually added at the start of the conching phase. This produces a mass having a high fat content which is very soft and no longer permits dry conching. When a comminuted cocoa mass is added into the conche, this must proceed right at the start of conching in order to ensure that the aroma of the chocolate is not adversely effected by the high fraction of cocoa dry matter. According to the present invention, the cocoa butter fraction, in contrast, can be added at a later time in the conching phase, since the aroma concentration—owing to the significantly lower fraction of fat-free cocoa dry matter—is lower and correspondingly only a lower aroma transfer to the sugar must be ensured. The chocolate masses produced by the novel process comprise, after conching, between 25 and 39% by weight, preferably between 28 and 36% by weight, of fat-free cocoa dry matter.

In contrast to production processes which use cocoa powder, there are significant advantages in the production and use of partially defatted cocoa mass in the lower capital costs of the decanter technology compared with cocoa powder presses, and in the lower operating and logistics costs.

According to the present invention, not only can cocoa mass be partially defatted, but hazelnut or almond pastes may also be produced for preparing a chocolate product having an increased hazelnut or almond fraction and/or having a reduced hazelnut or almond oil fraction.

BRIEF DESCRIPTION OF THE DRAWINGS

Preferred embodiments of the devices and processes according to the invention will be described hereinafter with reference to the drawings. In the drawings.

DETAILED DESCRIPTION OF PREFERRED EMBODIMENTS

Figure 1:
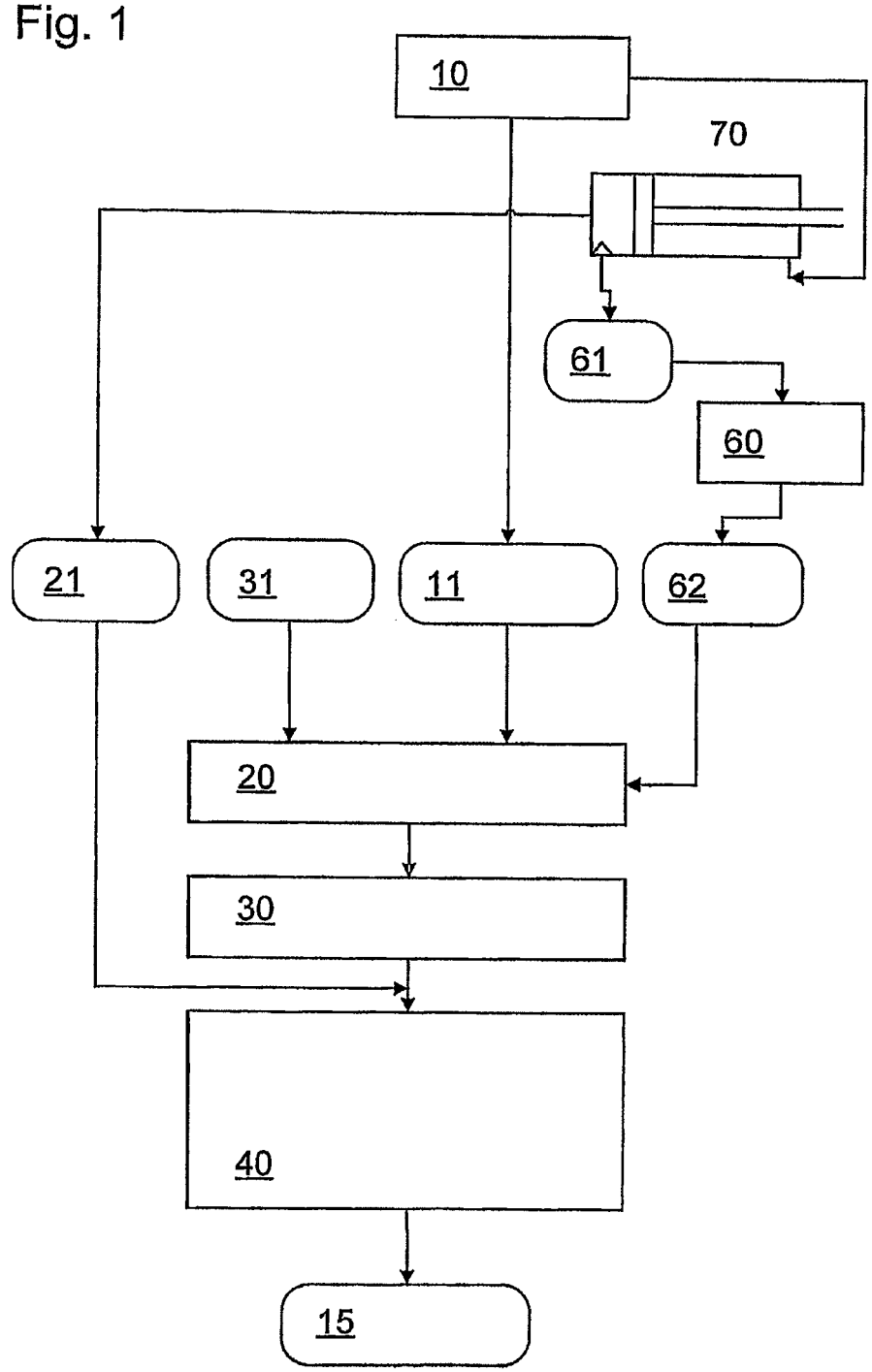
FIG. 1 shows a diagram of the production process according to the prior art.

FIG. 1 shows a conventional process for producing dark chocolate having a cocoa content of 70% by weight, in which cocoa mass 11 which has been previously ground in a ball mill 10 and has a fat content of approximately 52% by weight is in part fed to a high-performance press 70 in which—as described above—the cocoa butter 21 is pressed off as a liquid fraction at temperatures of 80° C. to 90° C. and a pressure of 500 bar. The cocoa cake 61 which is formed from the cocoa mass when the cocoa butter is being pressed off has, depending on the pressing, a fat content of 10 to 22%, and must be mechanically comminuted in a further process step 60 in order to obtain cocoa powder 62.

A second part of the cocoa mass is mixed with sugar 31 and cocoa powder 62 in a mixer to form a mass having a fat content of 27 to 34% by weight and is subsequently comminuted in a two-stage roll process 30. After the rolling 30, the mass is transferred into the conche 40 and cocoa butter 21 is added during the aroma refining. After completion of the conching, the residual cocoa butter is added in order to achieve the desired cocoa content, and thereafter the finished dark chocolate mass 15 having a cocoa content of about 70% by weight is available for further processing or for storage.

Figure 2:
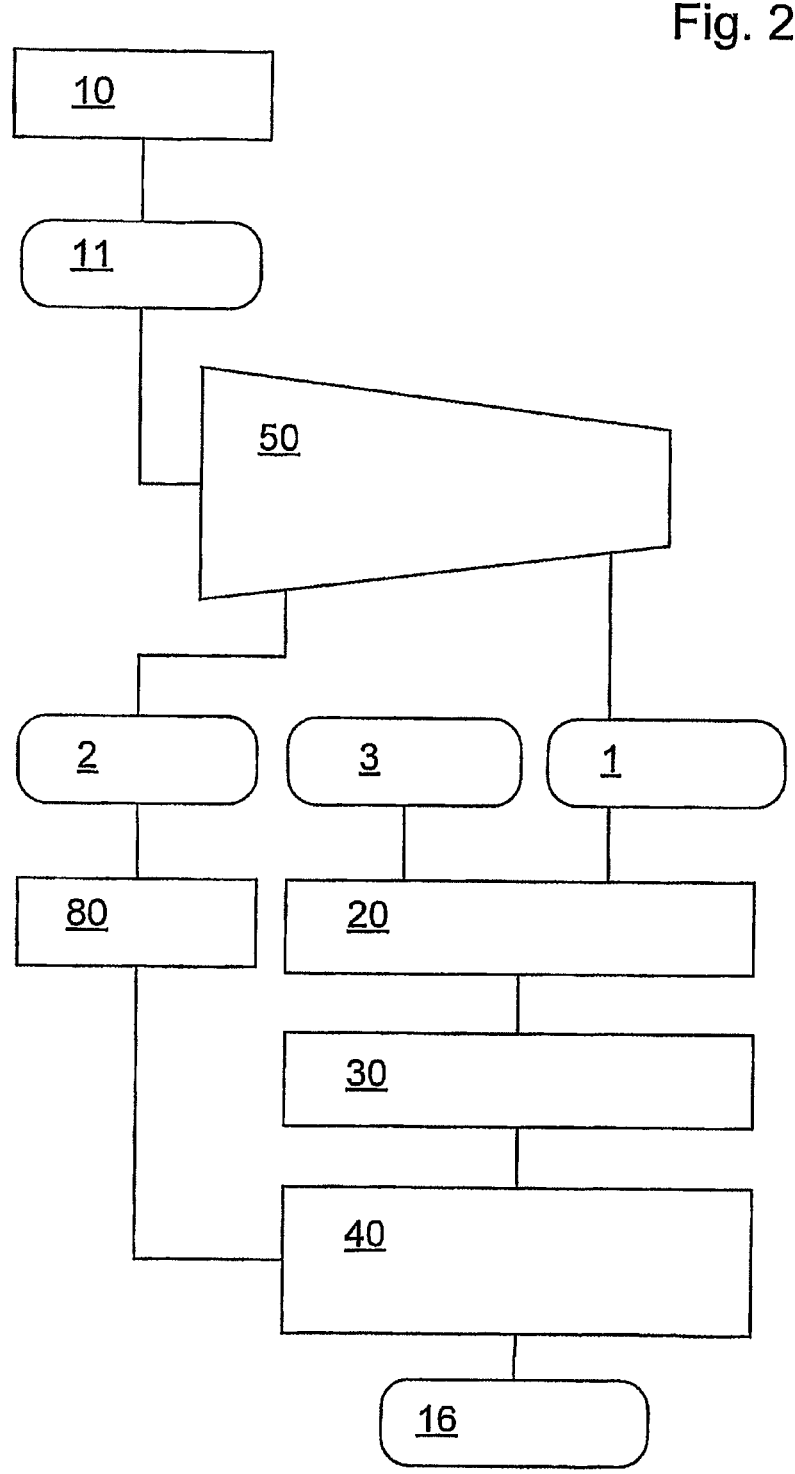
FIG. 2 shows a diagram of the production process according to an embodiment of the present invention.

The advantages of the process according to the invention can be clearly seen in FIG. 2. The cocoa mass is fed batchwise or continuously to a decanter 50 in an online process. According to a preferred embodiment, the previously produced cocoa mass is a single-variety cocoa mass 11. In the decanter 50, a cocoa butter fraction 2 is separated off in a continuous process. This cocoa butter fraction, in addition to cocoa butter, contains, for example up to 30% by weight of fat-free cocoa dry matter, preferably 17 to 21% by weight. As a second fraction, the decanter 50 yields a partially defatted cocoa mass 1 having a reduced fat content of, for example 42% by weight. This partially defatted cocoa mass 1, in a further process step, is mixed 20 together with the fraction of sugar 3 required by the recipe and a fraction of vanilla or vanillin which is not shown in the diagram and precomminuted using pre-rollers and fine rollers 30 before it is conched in the conche 40 in a further process step. In order to produce a chocolate mass 16 having a cocoa content of 70% by weight, to the comminuted mixture of partially defatted cocoa mass 1 and sugar 3 in the conche 40, there is added after some hours the cocoa butter fraction 2 which has been comminuted in the interim, preferably in a ball mill 80. By means of the treatment in the ball mill 80, the solid cocoa particles of the cocoa butter fraction 2 are already comminuted at the time point of addition into the conche 40 to a size of less than 20 μm, preferably to a size of 16 μm.

FIG. 2 shows that the process according to the present invention can be carried out as a continuous or semi-continuous process, which has proved to be extremely advantageous for the production logistics.

If single-variety dark chocolates are to be produced, a production, storage and finally correct addition of cocoa powder of the same variety or provenance need not be additionally monitored, since according to the invention the solid, fat-free cocoa components are not separated off as powder. Rather, they remain in the cocoa butter fraction and the partially defatted cocoa mass according to the present invention. The novel process makes it possible to avoid the detour, which is unnecessary from the production aspect, via the complex fractionation of a part of the cocoa mass into a highly defatted cocoa powder and an approximately solids-free cocoa butter. This is because these two fractions are combined again in any case in the conventional production process, and so the plant used for separation and the time expended are not very effectively used. In the process according to the present invention, this expenditure, in contrast, is avoided, since the cocoa mass is only partially defatted, and so it may be comminuted using the fine rollers without problem, but the pathway up to the highly defatted cocoa powder may be avoided.

LIST OF REFERENCE NUMBERS

1 Partially defatted cocoa mass
2 Cocoa butter fraction
3, 31 Sugar
10 Roll mill
11 Cocoa mass
15 Dark chocolate containing cocoa powder
16 Dark chocolate
20 Mixer
21 Cocoa butter
30 Fine mill
40 Conche
50 Decanter
60 Mechanical comminution
61 Cocoa cake
62 Cocoa powder
70 High-performance press
80 Ball mill

The invention claimed is:

1. A method for producing dark chocolate, the method comprising:
   partially defatting cocoa mass to a fat content of 42 to 49% by weight;
   separating an intermediate product from the cocoa mass, the intermediate product comprising cocoa butter and fat-free cocoa dry matter, wherein the fat-free cocoa dry matter is a proportion of 5 to 30% by weight of the intermediate product;
   mixing the partially defatted cocoa mass with sugar and comminuting before a conching phase; and
   adding the intermediate product comprising the cocoa butter and the fat-free cocoa dry matter to the partially defatted cocoa mass during the conching phase, wherein the cocoa butter and fat-free cocoa dry matter are not separated prior to adding the intermediate product to the partially defatted cocoa mass;
   wherein the method produces dark chocolate having a cocoa mass content of at least 57% by weight without adding cocoa powder.

2. The method according to claim 1, wherein the cocoa butter fraction is ground to give a ground cocoa butter fraction.

3. The method according to claim 1, wherein the chocolate mass after conching comprises between 25 and 39% by weight, of fat-free cocoa dry matter.

4. The method according to claim 1, wherein the cocoa mass is partially defatted in a decanter.

5. The method according to claim 4, wherein the decanter, for partial defatting of the cocoa mass, is operated at a differential speed of rotation between a drum and an internal screw of 18 to 23.

6. The method according to claim 4, wherein the decanter, for partial defatting of the cocoa mass, is operated at a differential speed of rotation between a drum and an internal screw of 13 to 25.

7. The method according to claim 1, wherein the cocoa mass is partially defatted in a continuous flow process.

8. The method according to claim 1, wherein the yield of partially defatted cocoa mass is between 65 and 90%.

9. The method of claim 1, wherein the partially defatted cocoa mass is a single-variety cocoa mass, and the chocolate mass which is produced is a chocolate mass having a single variety of cocoa.

10. The method according to claim 1, wherein the chocolate mass produced is a chocolate mass having a high cocoa mass content of 57 to 80% by weight.

11. The method of claim 1, further comprising partially defatting cocoa mass to the fat content of 45 to 49% by weight with separation of the cocoa butter fraction.

12. The method of claim 1, further comprising partially defatting cocoa mass to the fat content of 47% by weight with separation of the cocoa butter fraction.

13. The method of claim 1, wherein the separated cocoa butter fraction contains a proportion of 17 to 21% of fat-free cocoa dry matter.

14. The method according to claim 1, wherein the chocolate mass after conching comprises between 28 and 36% by weight of fat-free cocoa dry matter.

15. The method according to claim 1, wherein the yield of partially defatted cocoa mass is between 75 and 85%.

16. The method according to claim 1, wherein the chocolate mass produced is a chocolate mass having a high cocoa mass content of 65 to 75% by weight.

17. A method for producing a single variety dark chocolate, the method comprising:
   decanting, by a decanter, a cocoa mass resulting in a partially defatted cocoa mass fraction having a fat content of 42 to 49% by weight and a cocoa butter fraction including fat-free cocoa dry matter, wherein the fat-free cocoa dry matter is a proportion of 5 to 30% of the cocoa butter fraction by weight; and
   adding the cocoa butter fraction and cocoa dry matter to the partially defatted cocoa mass fraction during a conching phase, wherein the cocoa butter fraction and fat-free cocoa dry matter are not separated;
   wherein the method produces dark chocolate having a cocoa mass content of at least 57% by weight without adding cocoa powder.

18. The method of claim 17 further comprising mixing the partially defatted cocoa mass with sugar and comminuting before the conching phase.

19. The method of claim 17 further comprising comminuting the cocoa butter fraction before the conching phase.

* * * * *